United States Patent
Chan et al.

(10) Patent No.: US 10,394,415 B2
(45) Date of Patent: *Aug. 27, 2019

(54) USER AUTHENTICATION SECURITY SYSTEM

(71) Applicant: INTERNATIONAL BUSINESS MACHINES CORPORATION, Armonk, NY (US)

(72) Inventors: Yuk L. Chan, Rochester, NY (US); Michael D. Essenmacher, Red Hook, NY (US); David B. Lection, Raleigh, NC (US); Eric L. Masselle, Raleigh, NC (US); Mark Allen Scott, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,609

(22) Filed: Jul. 21, 2014

(65) Prior Publication Data

US 2016/0019378 A1  Jan. 21, 2016

(51) Int. Cl.
*G06F 21/31* (2013.01)
*G06F 3/0481* (2013.01)
(Continued)

(52) U.S. Cl.
CPC ........ *G06F 3/04815* (2013.01); *G06F 3/0482* (2013.01); *G06F 3/04886* (2013.01); *G06F 21/36* (2013.01)

(58) Field of Classification Search
CPC ...... G06F 21/31; G06F 21/36; G06F 3/04883; G06F 3/04815; G06F 3/0482; G06F 3/04886
See application file for complete search history.

(56) References Cited

U.S. PATENT DOCUMENTS

| 6,198,472 B1 * | 3/2001 | Lection | G06F 3/0213 |
| | | | 345/161 |
| 6,411,292 B1 * | 6/2002 | Cook | G06F 3/04812 |
| | | | 345/419 |

(Continued)

OTHER PUBLICATIONS

American English definition and synonyms, Macmillan Dictionary—http://www.macmillandictionary.com/dictionary/american/select_1#select_4.*

(Continued)

*Primary Examiner* — Samson B Lemma
*Assistant Examiner* — Richard W Cruz-Franqui
(74) *Attorney, Agent, or Firm* — David B. Woycechowsky

(57) ABSTRACT

A method, system or computer usable program product for providing secure user authentication including presenting a displayed representation of a three dimensional object having multiple selection areas, wherein respective selection areas are represented on at least two faces of the object and a symbol is depicted in each of the multiple selection areas; receiving a sequence of user inputs including a plurality of user selections of respective selection areas of the object indicating selection of the respective symbol and at least one user input indicating a movement of the object between the two faces so that user selection of selection areas on each of the two faces is accomplished; utilizing a processor to compare the sequence of user inputs to a predetermined authentication sequence stored in memory; and responsive to a positive comparison of the predetermined authentication sequence, providing user authentication.

20 Claims, 9 Drawing Sheets

(51) Int. Cl.
*G06F 3/0482* (2013.01)
*G06F 21/36* (2013.01)
*G06F 3/0488* (2013.01)

(56) References Cited

U.S. PATENT DOCUMENTS

| | | | | |
|---|---|---|---|---|
| 6,822,662 | B1* | 11/2004 | Cook | G06F 3/04842 |
| | | | | 715/788 |
| 8,362,875 | B2* | 1/2013 | Morin | G06F 21/36 |
| | | | | 340/5.2 |
| 8,363,052 | B2 | 1/2013 | Xin et al. | |
| 8,477,139 | B2* | 7/2013 | Robinet | G06F 3/04815 |
| | | | | 345/419 |
| 8,621,396 | B1* | 12/2013 | Gossweiler, III | G06F 3/0488 |
| | | | | 713/183 |
| 8,863,271 | B2* | 10/2014 | Griffin | G09C 5/00 |
| | | | | 726/16 |
| 8,990,959 | B2* | 3/2015 | Zhu | G06T 19/20 |
| | | | | 345/419 |
| 9,019,312 | B2 | 4/2015 | Ishidera | |
| 9,146,669 | B2* | 9/2015 | Kim | G06F 3/017 |
| 9,158,397 | B2* | 10/2015 | Kim | G06F 3/041 |
| 9,264,417 | B2* | 2/2016 | Yu | G06F 21/00 |
| 2007/0006287 | A1* | 1/2007 | Noda | G06F 21/36 |
| | | | | 726/4 |
| 2009/0046856 | A1* | 2/2009 | Mitchell | G09C 5/00 |
| | | | | 380/243 |
| 2009/0157738 | A1* | 6/2009 | Lection | G06F 3/04817 |
| 2010/0073126 | A1 | 3/2010 | Morin et al. | |
| 2011/0053675 | A1 | 3/2011 | Aoki et al. | |
| 2011/0162066 | A1 | 6/2011 | Kim et al. | |
| 2011/0166916 | A1* | 7/2011 | Inbar | G06F 3/0481 |
| | | | | 705/14.4 |
| 2012/0291122 | A1* | 11/2012 | Chow | H04N 13/128 |
| | | | | 726/19 |
| 2013/0027318 | A1* | 1/2013 | Lection | G06F 3/0486 |
| | | | | 345/173 |
| 2014/0077454 | A1* | 3/2014 | Lapstun | A63F 13/005 |
| | | | | 273/153 S |
| 2014/0189798 | A1* | 7/2014 | Grimaud | G06F 21/36 |
| | | | | 726/4 |
| 2015/0007078 | A1 | 1/2015 | Feng et al. | |
| 2016/0019378 | A1* | 1/2016 | Chan | G06F 3/04815 |
| | | | | 726/5 |
| 2016/0019382 | A1* | 1/2016 | Chan | G06F 3/04815 |
| | | | | 726/19 |
| 2016/0077593 | A1* | 3/2016 | Zuger | G06F 1/163 |
| | | | | 345/173 |

OTHER PUBLICATIONS

NPL Search (Google Scholar) (Year: 2019).*
"List of IBM Patents or Patent Applications Treated as Related" dated Jul. 22, 2016, including U.S. Appl. No. 14/839,634, filed Aug. 28, 2015, entitled "User Authentication Security System".

* cited by examiner

FIG. 9

| User ID | Object Type | Password Sequence | Temporal Components | Sensitivity |
|---|---|---|---|---|
| John_Doe | Alpha Cube | XXXXXX | YYYYY | 1 |
| Jane_Doe | Pictorial Cube | XXXXXX | YYYYY | 2 |
| John_Smith | Pyramid | XXXXXX | YYYYY | 1 |
| Mary_Smith | Numeric Cube | XXXXXX | YYYYY | 3 |

USER AUTHENTICATION SECURITY SYSTEM

BACKGROUND

1. Technical Field

The present invention relates generally to a user authentication security system, and in particular, to a computer implemented security system and method for utilizing user selections of and gestures manipulating a displayed object to authenticate the user.

2. Description of Related Art

A variety of processes have been utilized to authenticate a user of electronic systems such as a computer, email or a web account. Often the user is instructed to provide a user identification number or name (user ID) and a password. The electronic system then determines whether the user ID is in a database of user IDs and then determines whether the password provided by the user matches the password stored with the user ID in the database. Sometimes the user is also required to provide a number periodically generated by a hardware or software token which is compared to what the electronic system expected from an internally generated number using a parallel token. Other types of authentication systems are utilized in many different applications.

Another type of security feature is to determine whether a computer may be masquerading as a user. That is, a computer may be generating thousands or millions of user IDs and passwords to try to improperly access an electronic system. A captcha (Completely Automated Public Turing test to tell Computers and Humans Apart) user authentication test may be utilized to authenticate that the user is a human rather than a machine. A variety of such user authentication tests have been utilized including displaying a set numbers and characters of various sizes and orientations with a disjointed background. The user is then requested to enter the displayed numbers and characters. A human can usually discern the displayed numbers and characters whereas a computer typically cannot.

SUMMARY

The illustrative embodiments provide a system or computer usable program product for providing secure user authentication including presenting a displayed representation of a three dimensional object having multiple selection areas, wherein respective selection areas are represented on at least two faces of the object and a symbol is depicted in each of the multiple selection areas; receiving a sequence of user inputs including a plurality of user selections of respective selection areas of the object indicating selection of the respective symbol and at least one user input indicating a movement of the object between the two faces so that user selection of selection areas on each of the two faces is accomplished; utilizing a processor to compare the sequence of user inputs to a predetermined authentication sequence stored in memory; and responsive to a positive comparison of the predetermined authentication sequence, providing user authentication.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 9 is a diagram of a database of user passwords in which various embodiments may be implemented.

DETAILED DESCRIPTION

Processes and devices may be implemented for utilizing user selections of selection areas and gestures to indicate movement of a multidimensional object to authenticate the user by comparing the user selections and gestures to a predetermined authentication sequence. These processes and apparatuses may be implemented and utilized as will be explained with reference to the various embodiments below.

Figure 1:
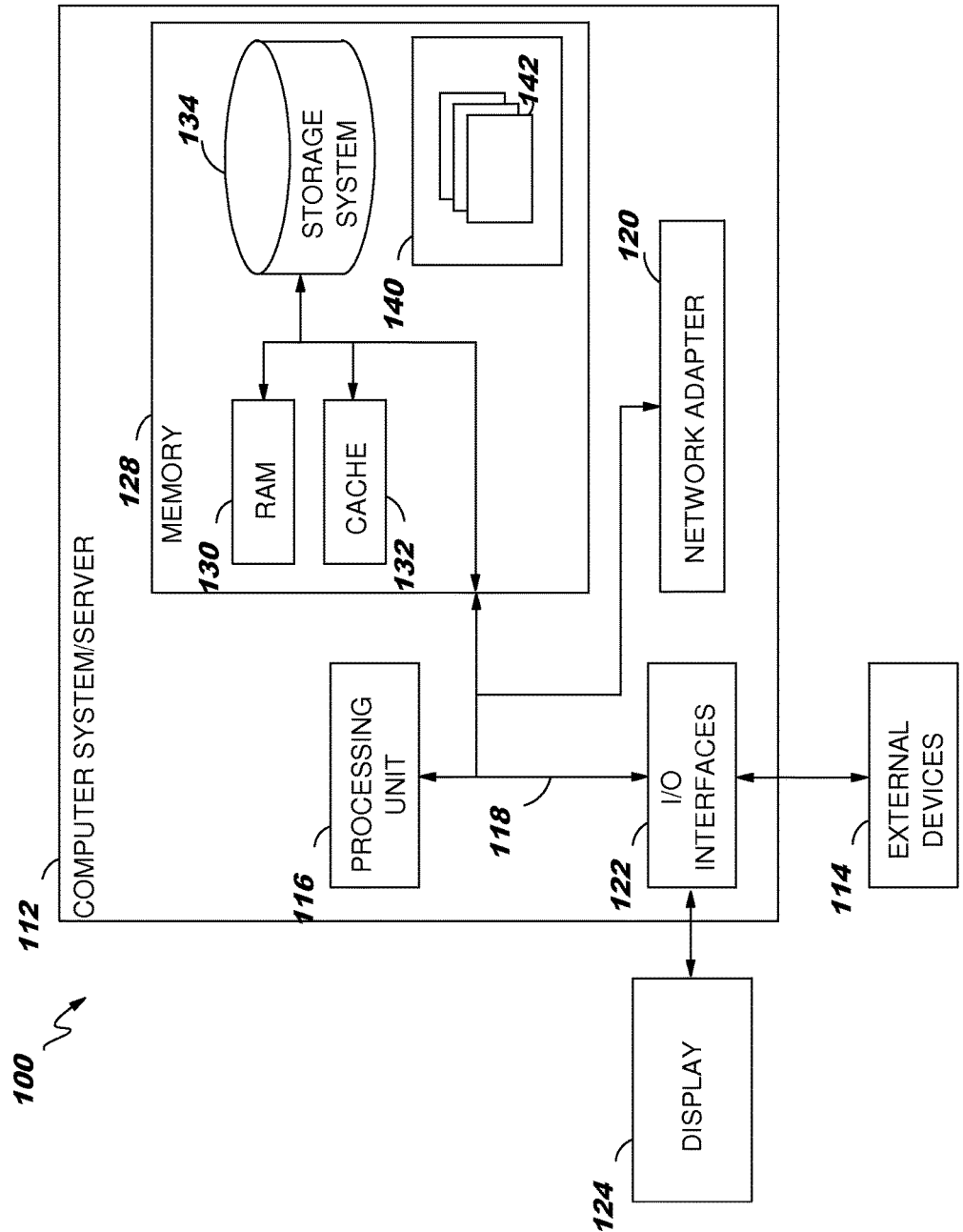
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as utilizing user selections and gestures of a multidimensional object to authenticate the user.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for utilizing user selections and gestures of a multidimensional object to authenticate the user.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
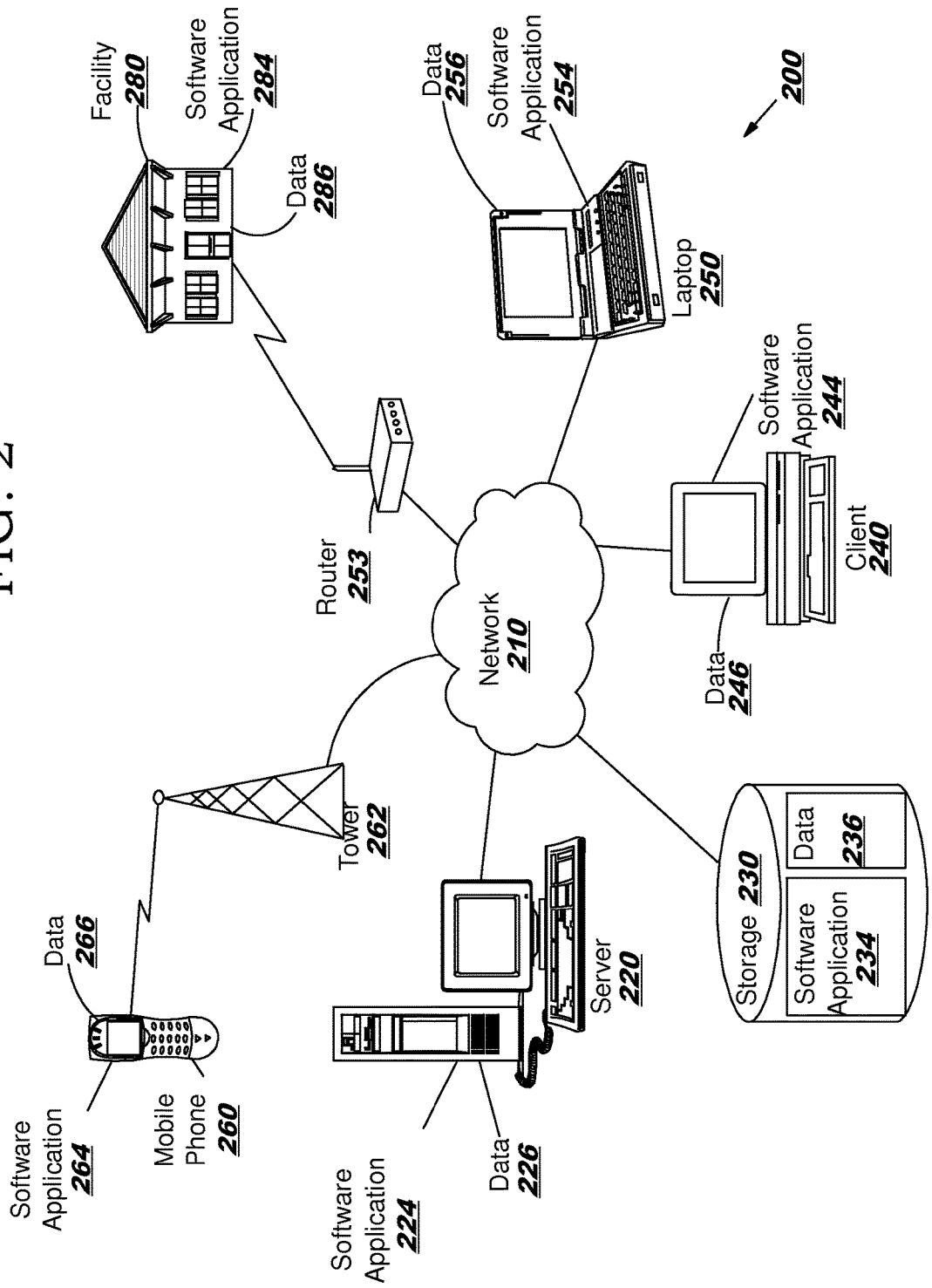
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for utilizing user selections and gestures of a multidimensional object to authenticate the user may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for utilizing user selections and gestures of a multidimensional object to authenticate the user or other software applications and data in accordance with embodiments described herein. Storage 230 may contain software application 234 and a content source such as data 236 for utilizing user selections and gestures of a multidimensional object to authenticate the user. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for utilizing user selections and gestures of a multidimensional object to authenticate the user.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
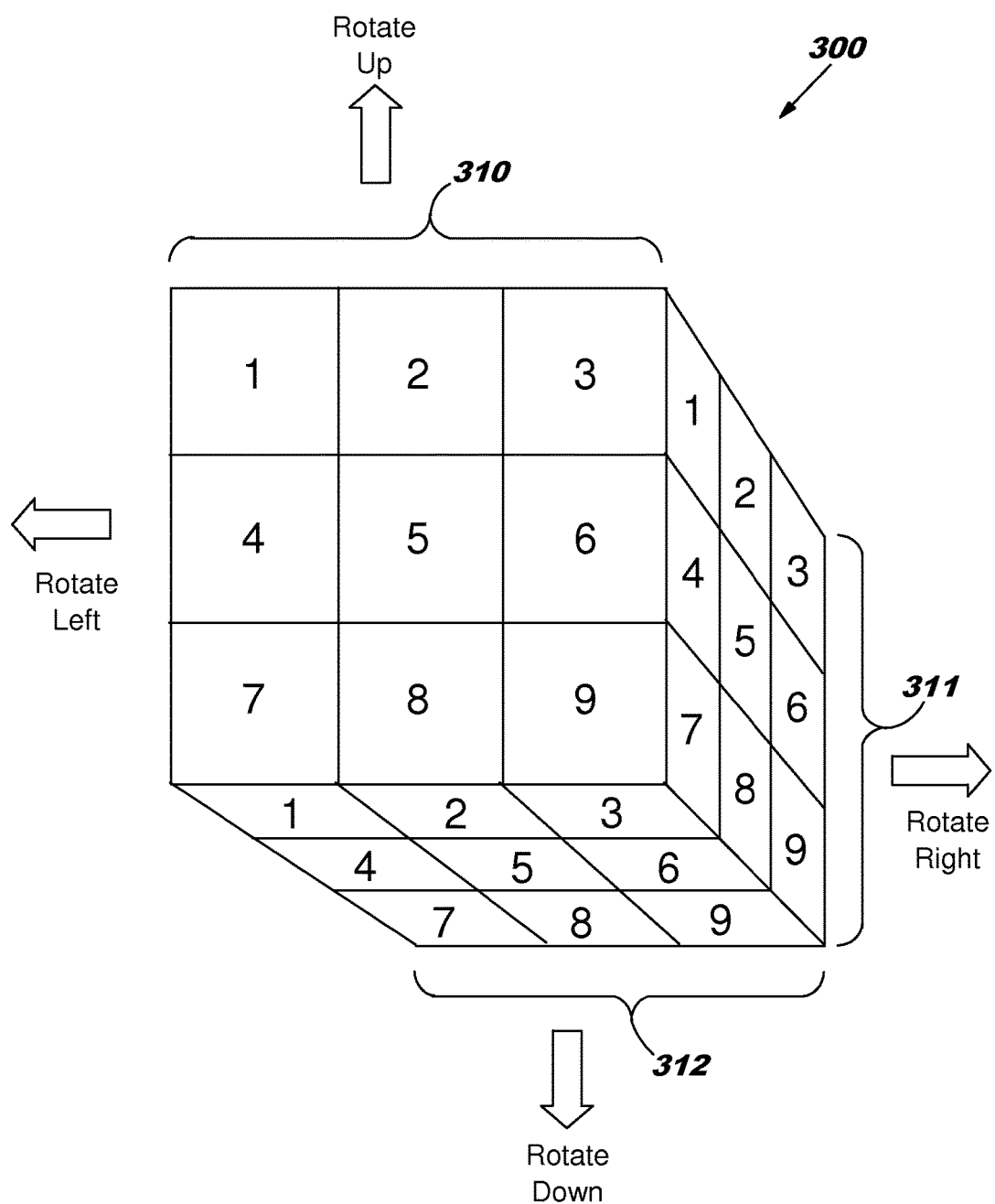
FIG. 3 is a diagram of a displayed object for a user to manipulate for user authentication in which various embodiments may be implemented.

FIG. 3 is a diagram of a displayed object for a user to manipulate for user authentication in which various embodiments may be implemented. In this embodiment, a three dimensional cube 300 can be displayed or otherwise rendered on a two dimensional display for viewing and manipulation by a user to provide user authentication such as by entering a password. In an alternative embodiment, the cube may be displayed on a three dimensional display, including but not limited to displaying or projecting the cube (or other object) as a holographic image.

Cube 300 includes 6 sides, surfaces or faces, three of which are visible (310, 311 and 312). Each cube face may have a different color or other visual indicators identifying each face. The front face 310 is active, whereas the other faces of the cube are not active that this time. That is, the user can press or select a position, location, or other selection area on the active side or face of the object such as one of nine buttons or other facial items displayed on front face 310. Each button has a number in this example. The buttons are currently inactive on the other faces in this example. The user can press or select a button or other facial item by pressing the button on a touch sensitive display, by using a mouse to move a cursor to one of the buttons and then clicking the mouse, or by simply entering the number on a key pad. Such selection types could be intermingled as part of the user input. For example, a first number may be selected by touch, the second number by mouse manipulation and the third number by keypad. This intermingling of user input types may also be part of a captcha. Alternative embodiments could include active faces other than the front face to allow the user to select a facial item on a side face, or selecting multiple items on the same face or multiple faces at the same time for additional security. The numbers on a face could be re-positioned each time the cube is loaded, and user can be expected to select the correct number that might have moved to a different position.

Each object has one or more surfaces that are sensitive to interactions from the user. These interactions could be physical, for example, as in an actual physical human input that interacts with the computer hardware operatively connected to the object, or an interaction that is virtual, for example, a voice interaction with the object. These two examples are not intended to limit the types of interactions a user could have with a surface of the object, but are examples for illustrative purposes. In the simplest case, a face is a side surface of an object that is bound by a set of edges or other distinguishing features. For example, cube 300 has 6 faces delineated by 12 edges (the defined boundary). In a more complex example, a face could include part of the 3 connected planar surfaces in cube 300, of which, each planar surface is partitioned and each partition belong to different faces. And, multiple such faces can be formed on cube 300. Each face includes a set of selection areas, each of which may each be identified by a symbol. However, when displayed on a two-dimensional display, only three or less faces of cube 300 may be visible at a time. As a result, only the visible faces may be active whereby the user can select a selection area by mouse clicking or otherwise indicating a symbol on an active area. Some visible faces may not be active depending on the application. Typically faces are planar, but they may also be non-planar such as curvilinear or even formed from more complex shapes. For example, the symbols may be raised or other raised or indented features may be included on each object face. Two or more faces may even be planar with each other. For example, concentric planar rings that rotate independently may be planar, but still distinguished by the edges of each ring and the sides of each ring. The user can then use a gesture to rotate the cube in one of four directions in this embodiment. That is, the cube may be rotated up, down, left or right, thereby activating a different face of the cube. The user can gesture the direction of rotation by swiping the cube towards the direction of rotation on a touch sensitive display, by using a mouse and cursor to also swipe the cube towards the direction or rotation, or simply by using the arrow leys on a keyboard as a gesture. Alternative embodiments may use other methods to indicating the direction of rotation. For example, by swiping the cube to the left in a gesture, face 311 may rotate towards the front of the cube, thereby activating that face. Once face 311 is activated, then the user may select one of the buttons on that face. The direction of rotation could include rotation at more granular degree. It could be upper-left, upper-right, or any direction demanded by the security algorithm. Such gesture types could be intermingled as part of the user input. For example, a first object rotation may be selected by touch, the second rotation by mouse manipulation and the third rotation by keypad. This intermingling of user input types may also be part of a captcha.

This process of selecting a button or other facial items from an active face of the object and then gesturing a direction of rotation may be repeated multiple times. For example, a password may be a series of selections and gestures such as select 1, gesture right, select 4, gesture up, select 9, gesture left, and select 2. Of course, more than 1 button may be selected on a face between gestures and two or more gestures may be provided between button selections such as select 1, gesture right, gesture right, select 7, select 8, gesture up, select 7. In a touchscreen application, multiple gestures may be provided in sequence without the user lifting a finger from the touchscreen. For example, the user may simply pause between gestures such as by pressing a button and then swiping in the direction of rotation. Also, a separate field adjoining the displayed object may be used for providing gestures. Alternative embodiments may utilize other methods for indicating selections and gestures. This provides a wide range of variations, any of which may be utilized as a password.

Alternative embodiments may utilize a different number of selections on an object face, alternative selections such as characters, pictures, colors, (e.g. A, Q, cat, dog, yellow, green), etc. The selections may also be left blank and the user selects a button based on location or shape. The buttons or other selectable items or locations on each face may be square rectangular, circular, oval, etc. In addition, alternative types of objects, faces, buttons, or other selections may be utilized. For example, instead of a cube, an object may be a rectangle, a rhombus, a polyhedron such as an octahedron, etc. Instead of being a static object that does not change shape, the cube may be a type of Rubik's cube or other type of subdivided object where each row and column may rotate independently. Multiple objects may be displayed for manipulation with selections and gestures in a certain sequence. Alternative types of other dynamic shapes or other type of dynamic actions of those shapes may be utilized. For example, the object may be set of concentric cylinders where each cylinder rotates and/or protrudes independently, or a set of objects containing other objects like a type of Russian nesting doll. The objects may include concave or convex faces and more than one face may be active at a time. The face may actually be an image of a human face where the user may select a nose, mouth, eye or ear, or the face may be a scene such as a painting where the user selects objects in the painting. Such selections may differ depending on the age of the user.

Figure 4:
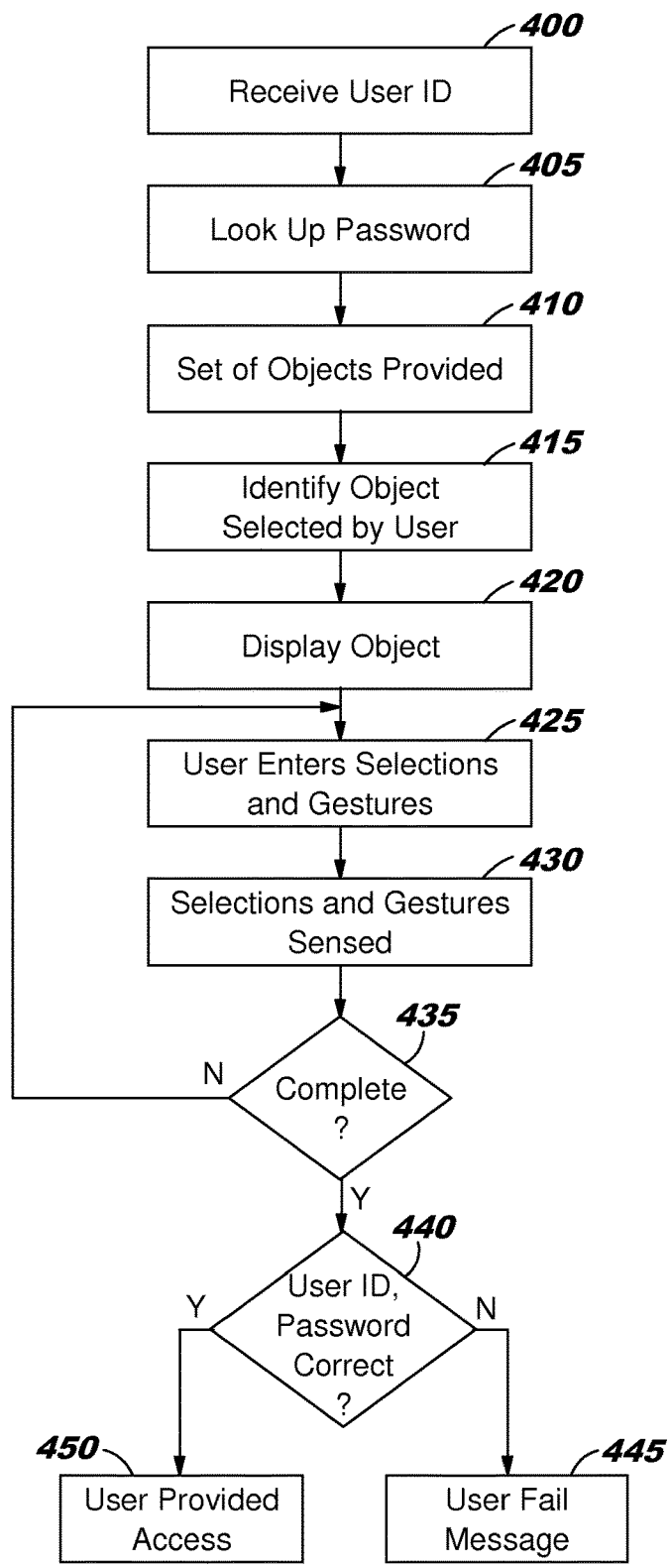
FIG. 4 is a flow diagram of an electronic system providing an object for a user to manipulate for user authentication in accordance with a first embodiment.

FIG. 4 is a flow diagram of an electronic system providing an object for a user to manipulate for user authentication in accordance with a first embodiment. The electronic system may be a computer requiring user authentication before allowing access to the computer's resources, a website requiring authentication before allowing access to the user's account, etc. In a first step 400, a user ID is received from the user. The user ID is then used in step 405 to look up the corresponding password for that user in a user ID database for user authentication. If the user ID is not valid in step 405, that invalidity of the user ID is typically not disclosed to the user until after the password has been provided. This prevents the user from knowing which information was incorrectly entered, thereby providing greater security. Step 405 may be performed later in the process such as when the user has completed entering a password. The user ID could be provided by the user with the same method as the password. In such a case, there could be two sets of input with one for the user ID and the other for the password. Alternatively, there could be a single set of input containing both user ID and password, where the system would identify which portion of the input belongs to user ID and which portion belongs to password.

Then in step 410, the user is then provided a set of objects to select for entering the password. For example, a thumbnail of objects is provided for the user to select. For example, there may be a cube with numbers, a cube with characters, a cube with animal pictures, a rectangle with numbers, an octahedron with multiple colors on each side, etc. In step 415, it is determined which object was selected by the user (e.g., by sensing the user touching the object on a touch screen) and that object is then displayed in full size in step 420. Then in step 425, the user proceeds with entering a password using a series of selections and gestures as described above with reference to FIG. 3. That series of selections and gestures is then sensed and captured by the electronic system in step 430. The electronic system then detects whether the user has indicated that the password entry is completed in step 435. That can be indicated by the user by pressing the enter key on the keyboard, by pressing a complete button on a touch screen or with a mouse and cursor, or by simply not making any additional selections or gestures for a period of time such as 3 to 5 seconds. If not, processing returns to step 425, otherwise processing continues to step 440.

It is determined in step 440 whether the user ID was found in the user ID database, whether the correct object was selected by the user for entering the password, or whether the password was correctly entered. This includes comparing the user inputs (user selections and gestures) of the object to a predetermined authentication sequence. If any of these conditions did not occur, then the user is not authenticated and in step 445 the user is notified of that fact in a displayed message such as "User ID or Password Incorrect". Processing may return to step 400 to allow the user to try again. In an alternative embodiment, the user may be given only three tries to correctly enter the user ID and password before his or her user ID is locked and the user is instructed to call a number to reset his or her user ID and/or password. If the user is authenticated in step 440, then processing continues to step 450 where the user is given the access allowed by the electronic system for that user ID.

Figure 5:
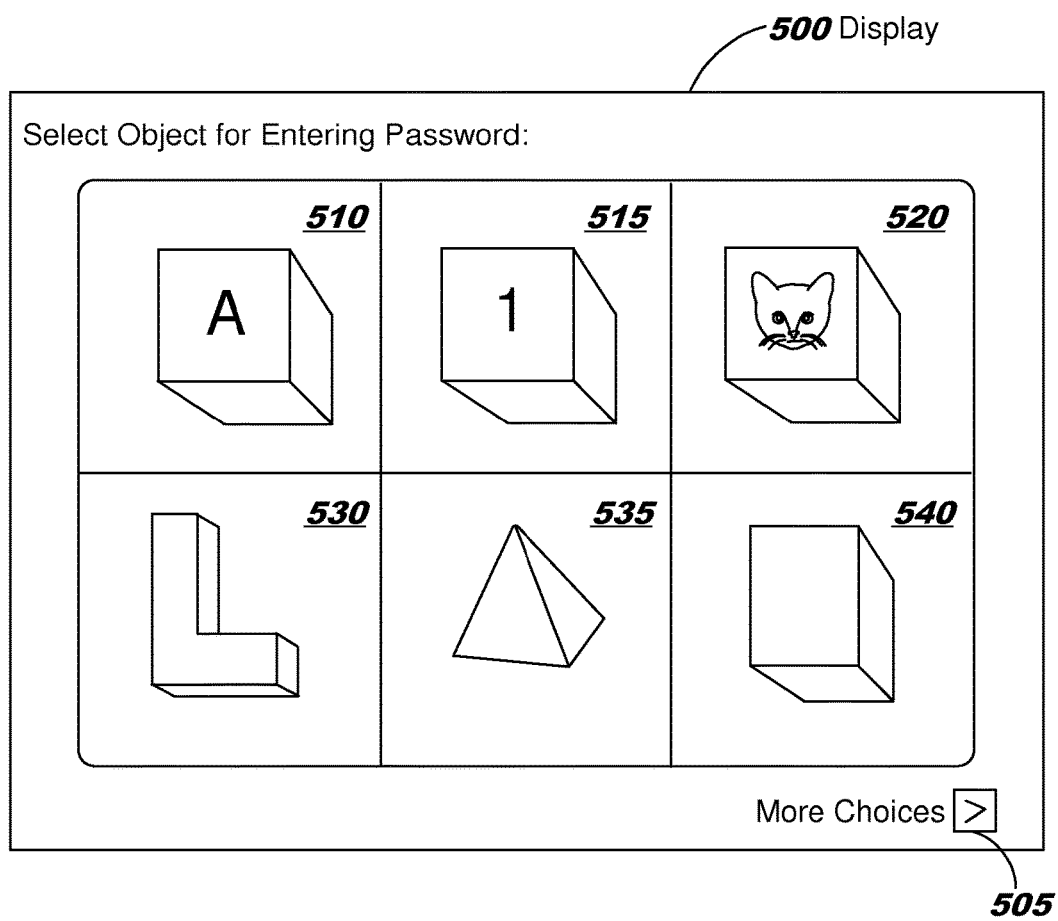
FIG. 5 is a diagram of a set of objects displayed for a user to select for user authentication in accordance with the first embodiment.

FIG. 5 is a diagram of a set of objects displayed for a user to select for user authentication in accordance with the first embodiment. There are six different objects displayed on display 500 for the user to select from for user authentication. Additional objects may be provided by adding more objects to the displayed page or by allowing the user to select from multiple pages of objects such as by selecting button 505.

In this example, the top three objects 510, 515 and 520 are all cubes, but each cube may have different types of button graphics for use in selections. In this example, object 510 is an alphabetic cube, object 515 is a numeric cube, and object 520 is a pictorial cube. For ease of reading, only the first letter, number or picture is displayed on the face of the cube for ease of reading and selection. For example, cube 515 corresponds to the cube shown in FIG. 4 above.

The bottom three objects 530, 535 and 540 are other types of objects that may be selected. Object 530 is an L shaped object, which may be easier to visualize during manipulation due to its asymmetry. Object 535 is a four-sided pyramid (four triangle faces with a square base). Object 540 is a rectangular cube, which also may be easier to visualize during manipulation due to one side being longer than the other side. For example, object 540 may have 6 buttons on each side face in a 3×2 pattern, but have a 2×2 pattern on the bottom and top faces.

Many other types of objects may be utilized with many other types of button graphics to distinguish between choices. Further, objects or shapes can be subdivided, where portions of the object move independently from the whole, while constrained by the whole. A prime example is the cube made to operate like a 3×3 Rubik's Cube, where the user entering a visual password could select, for example, one of the top three panels on the top "layer" of the cube and spin just that layer, while the remaining six panels of the middle and bottom layer remained fixed. Subsequent selection and gesture would operate the same.

Figure 6:
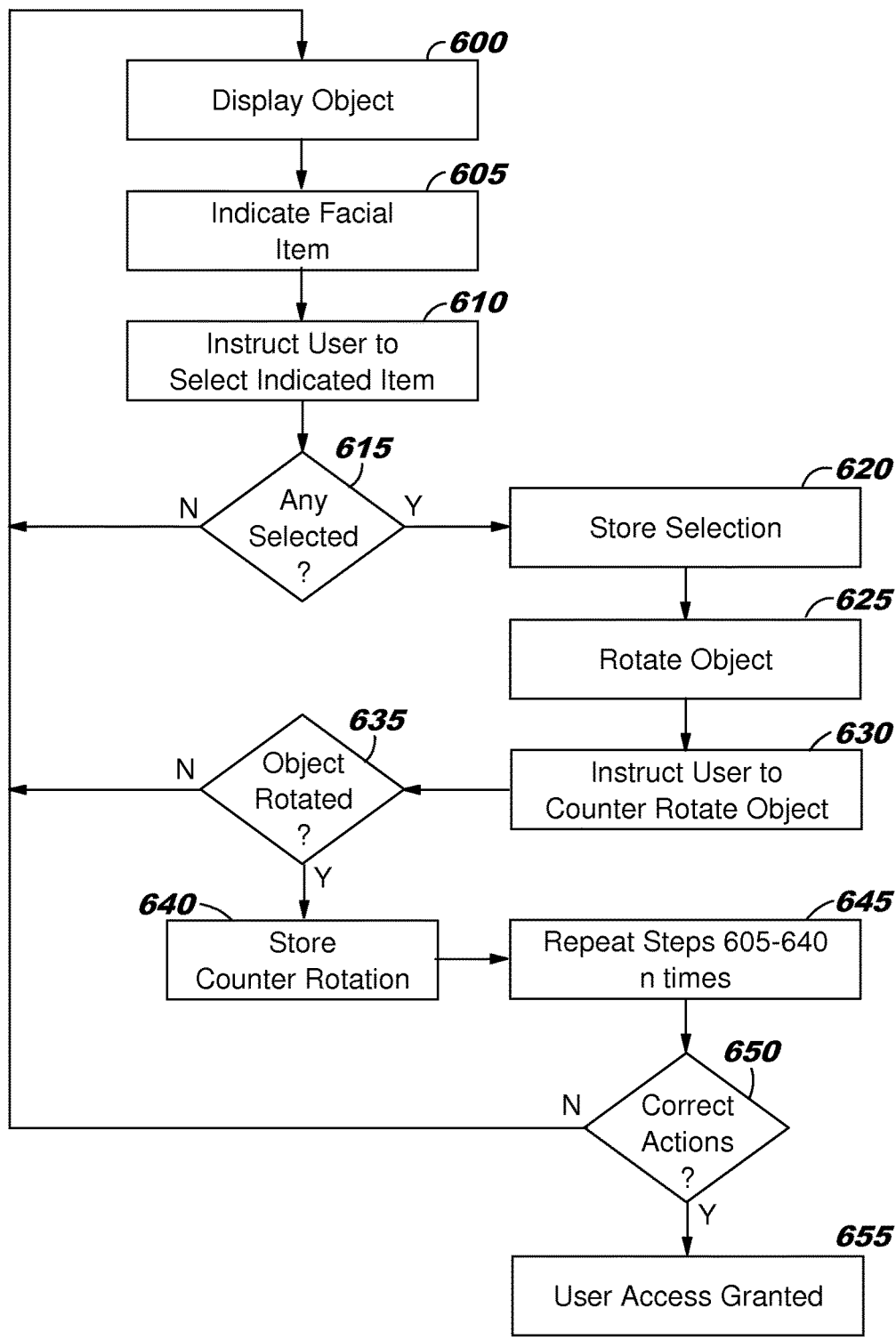
FIG. 6 is a flow diagram of an electronic system providing an object for a user to manipulate to authenticate that the user is a human and not a machine in accordance with a second embodiment.

FIG. 6 is a flow diagram of an electronic system providing an object for a user to manipulate to authenticate that the user is a human and not a machine in accordance with a second embodiment. That is, the same cube or other object may be utilized for user authentication (that the user is a human, not a computer) in a captcha application.

In this example, the electronic system displays an object such as a cube in step 600 in response to a user request to access a computer system, a website, etc. The object displayed may vary each time the captcha application is utilized. The electronic system then temporarily highlights or otherwise indicates a button or other portion of an active face in step 605. For example, the number 3 may be highlighted or all numbers other than 3 may be highlighted. In another example, the number or character to be selected may be displayed or otherwise indicated in a background area with a disjointed background, making the number difficult to read by an electronic device. The user is then instructed to select the indicated button or location on the active face of the displayed object in step 610. Then in step 615, it is determined whether the user selected a button within a reasonable period of time. If not, the test is either ended or restarted at step 600. If a button is selected by the user, the selection is stored in step 620 for comparison when the test is complete. That is, the user will not be informed if the captcha test is passed until all the steps are completed, thereby helping prevent a non-human from repeatedly guessing the answers until a success is accomplished.

Then is step 625, the system displays the object being rotated in a certain direction (e.g., up, down, left or right). The user is then asked in step 630 to utilize a gesture such as a swipe or pressing an appropriate arrow key to rotate the object back to the previous position. For example, if the object is rotated up, the user should rotate the object down to counteract the upwards rotation. Then in step 635, it is determined whether the user rotated the object within a reasonable period of time. If not, the test is either ended or restarted at step 600. If the user rotates the object, the rotation is stored in step 640 for comparison when the test is complete. That is, the user will not be informed if the captcha test is passed until all the steps are completed, thereby helping prevent a non-human from repeatedly guessing the answers until a success is accomplished.

Steps 605 through 640 are repeated one or more times in step 645. In each cycle, the user is asked to select an indicated button and counter-rotate the object through a gesture. Alternative embodiments may include multiple selections or gestures, possibly randomly generated to make it more difficult for a non-human to guess the appropriate selection or gesture.

Then in step 650, the stored user actions or manipulations (the selections and gestures) are compared to the actions requested by the electronic system (i.e., the indicated buttons and object rotations). This includes comparing the user inputs (user selections and gestures) of the object to the predetermined authentication sequence requested by the system. If the user correctly performed or otherwise entered the correct selections and gestures, then the user passes and processing continues to step 655, otherwise processing ceases or the user is returned to step 600. In step 655, the user is given access as requested.

Alternative embodiments may include alternative types of objects, buttons or other indications of facial items or locations to be selected.

Figure 7:
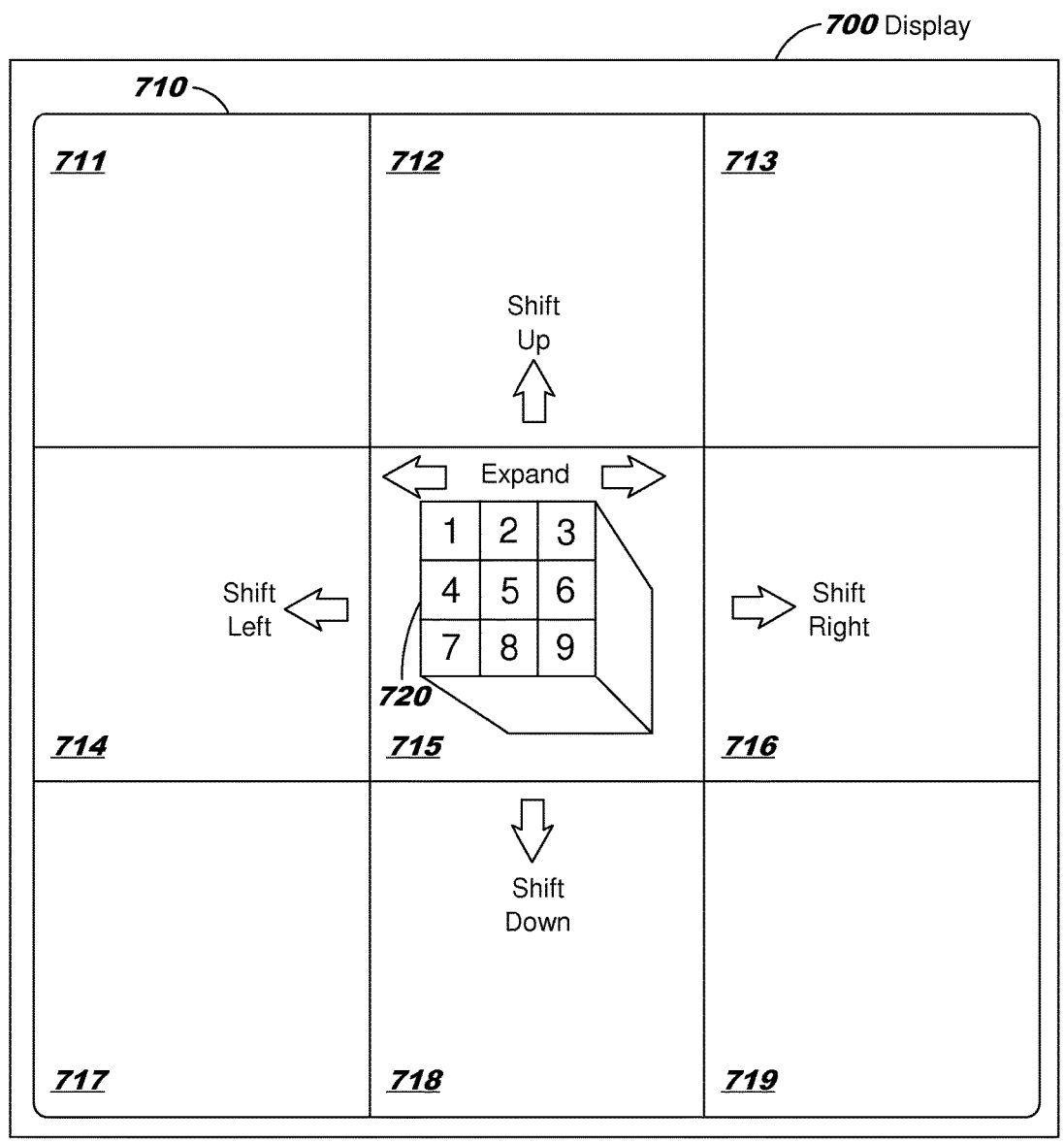
FIG. 7 is a diagram of a displayed object for a user to manipulate for user authentication in which various embodiments may be implemented.

FIG. 7 is a diagram of a displayed object for a user to manipulate for user authentication in which various embodiments may be implemented. A display 700 provides a set of frames 710, each frame labelled as 711 through 719. An object 720 is displayed in the middle frame 715.

In addition to rotating the object, the object may be shifted or otherwise translated to another frame. For example, the object may be shifted or otherwise translated to the right, left, up or down. The object may also be shifted diagonally, either directly or by shifting the object horizontally and then vertically. The shifting may be indicated by the user through a variety of gestures. For example, the object may be shifted to the right by touching a finger to the displayed object and then sliding the object to the right. Alternatively, the keyboard arrows may be utilized. To distinguish a translational gesture from a rotational gesture, different techniques may be utilized. For example, a single finger swipe may be considered a rotational gesture and a two finger swipe (indicating the object is being held) may be utilized to indicate that the object is being shifted in the direction of finger movement. Also, a linear swipe may be considered a translational movement of the object and a curvilinear swipe may be considered a rotational swipe. On a keyboard, the alt key may be pressed before pressing an arrow key to indicate that the object is being shifted rather than rotated. Many other alternative gestures may be utilized to indicate the object being rotated or shifted in a certain direction.

The object may also be expanded or shrunk using a sizing gesture. For example, by pressing two fingers on the object and then spreading both fingers can indicate that the object is being expanded. Alternatively, pressing two fingers on the object and then bringing those fingers together can indicate that the object is being shrunk. On a keyboard, the plus or minus key may be pressed to expand or contract the object. Many alternative gestures may be utilized.

As the object is being expanded or shrunk, the number of frames may vary. For example, the frames may be increased or decreased in number by shrinking and then expanding the object. For example, the object may appear as in FIG. 3, then shrunk by pressing two fingers to the sides of the object and then closing the fingers together, thereby causing the system to generate the frames shown in FIG. 7. The user can then move the object to the desired frame by moving the two fingers holding the object to the desired frame. This can be accomplished without lifting the two fingers from the touch-screen. The user can then rotate the object and/or select a button on the object. A button may be selected after a gesture, after multiple gestures, or multiple buttons may be selected between gestures. Other types of gestures may also be utilized.

Figure 8:
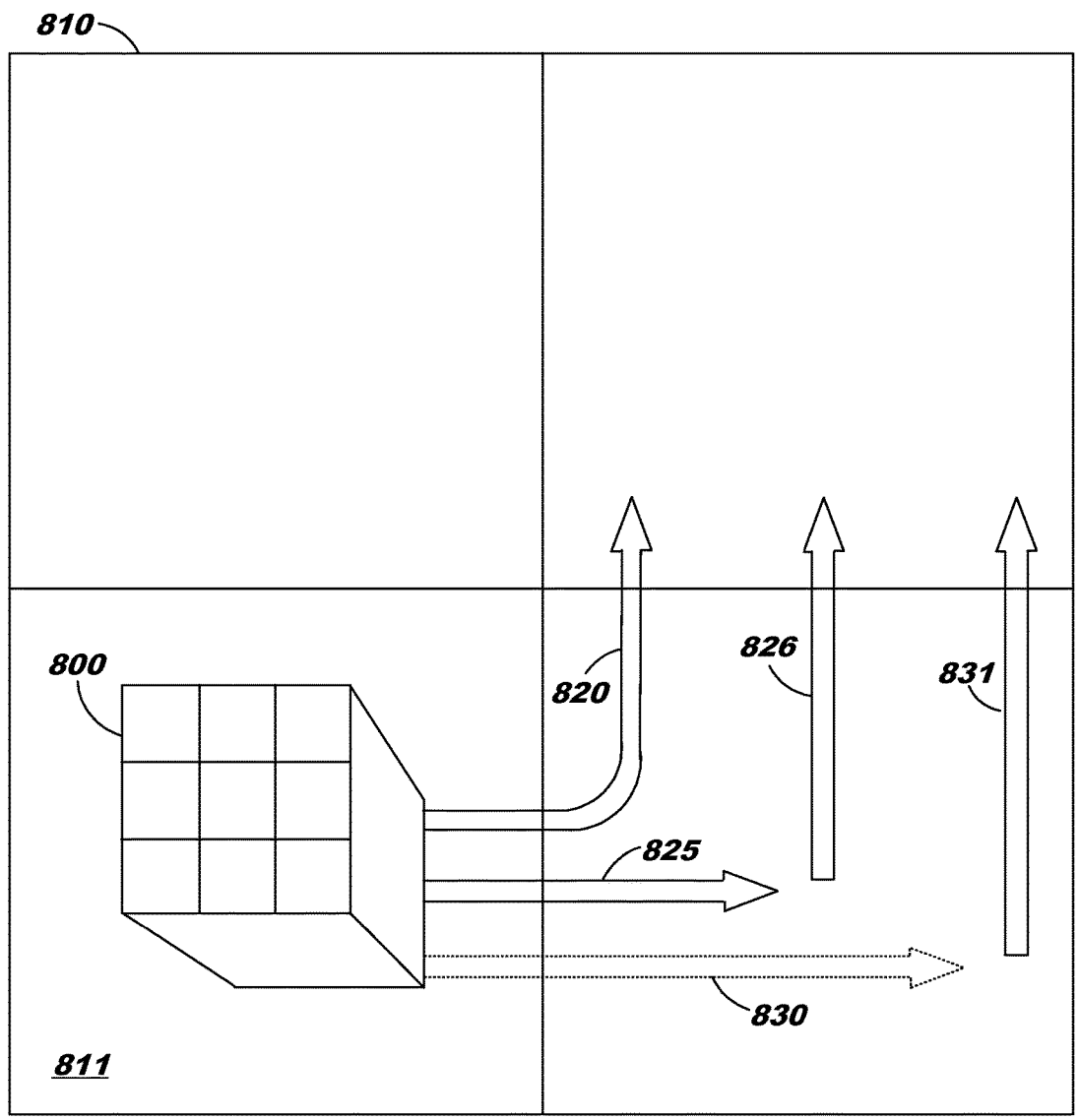
FIG. 8 is a diagram of a displayed object for a user to manipulate for user authentication in which various embodiments may be implemented.

FIG. 8 is a diagram of a displayed object for a user to manipulate for user authentication in which various embodiments may be implemented. In this embodiment, a temporal component or fourth dimension may be added to each selection or gesture or a combination of selections and gestures. That is, the speed and direction in which the selections and gestures are performed may be a component of those selections and gestures. This can include the velocity that an object is rotated, translated, or sized, any delays between gestures and selections, or other temporal factors which can be measured and compared.

In FIG. 8, a cube 800 is displayed in the left lower quadrant 811 of a display field 810. That object may be translated from the lower left quadrant to the upper right quadrant in several ways. The user may slide the cube to the right and up quickly in a quick continuous motion 820 with a given velocity. The user may quickly move the object to the right 825, then pause for a short time period before quickly move the object upwards 826. The user may slowly move the object to the right 830, then pause for a long time period before quickly moving the object upwards 831. Many other combinations of movements with various measurable temporal effects may be utilized by the user.

These temporal components can be measures as velocities or time needed to perform a gesture, delays or pauses, continuous or discontinuous movements, or even changes in velocity. Although a translational gesture is shown in this example, these same temporal components may be utilized for other gestures or even selections (e.g. delays between selections or how long a given selection is held.

The user can establish these temporal components when entering the password the first time or two. These temporal components may also be recognized over time by the system as a type of temporal digital signature of the user. In addition, a standard deviation or other measure of variance can be determined by the system for use in determining a probability that the user is entering the password or not. The user may also select a sensitivity of this temporal component based on the sensitivity and security requirements of the website, database, etc. that the user may be accessing.

In summary, the user can easily provide three types of gestures (rotational, translational and sizing) with one or more button or area selections in a specific sequence to generate a password or other type of user authentication data. In addition, a temporal component or fourth dimension can be included as part of this user authentication. As a result, the user can quickly and easily select a password from a tremendous number of possible password combinations.

FIG. 9 is a diagram of a database of user passwords in which various embodiments may be implemented. In this embodiment, the database 900 includes passwords for 4 users are shown with accompanying data. The database could be much more extensive in size, may be organized in a different configuration, and may be spread across multiple systems depending on the application. Other data such as what information a user can access may be included in database 900.

Each entry 910 for a user includes a user ID 911, a type of object 912 used for the password sequence, the password sequence 913, and any temporal components 914 including a sensitivity 915. User ID 911 may be a standard user ID with a set of alphanumerics that can be entered with a keyboard, may be similar to a password with selections and gestures, or may even be entered with the password and may also be entered with the password and a long sequence of selections and gestures. Type of object 912 is the object which the user may use to enter the password, such as a cube with letters. Password sequence 913 includes the set of selections and gestures which the user must enter to match the password. Temporal components 914 includes any measures of velocity, delays, speed, direction, etc. which the user mast match within a certain amount of allowable error to match these temporal components. Sensitivity 915 specifies the amount of error allowed for matching temporal components (e.g., within an 80% confidence) for an authenticated password. This sensitivity may be preset or modified by the user or an administrator based on factors such as the sensitivity of data which the user can access.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for utilizing user selections and gestures of a multidimensional object to authenticate the user. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer readable storage medium having program instructions embodied therewith, the program instructions executable by a processing circuit to cause the device to perform a method comprising;
   presenting a displayed representation of a three dimensional object having multiple faces that respectively include multiple active selection areas with each active selection area including a depiction of a selectable symbol on its corresponding face;
   sequentially receiving a plurality of user inputs as authentication inputs including; (i) a plurality of object movement type inputs that control what faces are visible in the presented display, and (ii) a plurality of active symbol selection type inputs, separate fain the object movement type inputs, to select selectable symbols depicted in respectively corresponding selected active areas, wherein the active symbol selection type inputs includes symbols currently displayed on active selection areas of the three dimensional object;
   determining, by the processing circuit, an authentication sequence based upon a combination of the object movement type inputs and separate active symbol selection type inputs;
   comparing, by the processing circuit, the authentication sequence to a predetermined authentication sequence to determine a match; and
   responsive to the determination of the match, providing user authentication.

2. The medium of claim 1 further comprising presenting a displayed representation of multiple three dimensional objects for selection wherein the predetermined authentication sequence includes the three dimensional object selected.

3. The medium of claim 1 further comprising measuring temporal components on the plurality of user inputs wherein comparing the authentication sequence of user inputs to a predetermined authentication sequence includes comparing the measured temporal components with predetermined temporal components of the predetermined authentication sequence.

4. The medium of claim 3 wherein a predetermined amount of variation is allowed between the measured temporal components and the predetermined temporal components and wherein the allowed amount of temporal variation is adjusted by the user.

5. The medium of claim 1 further comprising presenting a set of three dimensional objects for user selection; and receiving a user selection from the set of three dimensional objects; wherein presenting the displayed representation of the three dimensional object includes presenting the user selected three dimensional object.

6. The medium of claim 5 wherein the authentication sequence for comparison with the predetermined authentication sequence includes the user selected three dimensional object, the plurality of object movement type inputs and the plurality of area selection type inputs.

7. The medium of claim 1 further comprising displaying the predetermined authentication sequence as a captcha prior to receiving the authentication sequence based upon a combination of the object movement type inputs and area active symbol selection type inputs.

8. The medium of claim 7 wherein the three dimensional object is rotated as a portion of the captcha whereby the positive comparison of the predetermined authentication sequence includes a user movement input counter-rotating the three dimensional object.

9. The medium of claim 1 wherein the symbol depicted in at least one of the multiple action selection areas is repositioned to another one of the multiple action selection areas upon receiving the plurality of user inputs.

10. The medium of claim 1 wherein the plurality of object movement type inputs modify which visible face of the object is an active face, the active face including a plurality of active selection areas, each active selection area including a symbol for selection by the user.

11. A data processing system for providing secure user authentication, the data processing system comprising:
    a hardware processor; and
    a memory device storing program instructions which when executed by the hardware processor execute the steps of;
    presenting a displayed representation of a three dimensional object having multiple faces that respectively include multiple active selection areas with each active selection area including a depiction of a selectable symbol on its corresponding face;
    sequentially receiving a plurality of user inputs as authentication inputs including; (i) a plurality of object movement type inputs that control what faces are visible in the presented display, and (ii) a plurality of active symbol selection type inputs, separate from the object movement type inputs, to select selectable symbols depicted in respectively corresponding selected active areas, wherein the active symbol selection type inputs includes symbols currently displayed on active selection areas of the three dimensional object;
    determining, by the hardware processor, an authentication sequence based upon a combination of the object movement type inputs and separate active symbol selection type inputs;
    comparing, by the hardware processor, the authentication sequence to a predetermined authentication sequence to determine a match; and
    responsive to the determination of the match, providing user authentication.

12. The data processing system of claim 11 further comprising presenting a displayed representation of multiple three dimensional objects for selection wherein the predetermined authentication sequence includes the three dimensional object selected.

13. The data processing system of claim 11 further comprising measuring temporal components on the plurality of user inputs wherein comparing the authentication sequence of user inputs to a predetermined authentication sequence includes comparing the measured temporal components with predetermined temporal components of the predetermined authentication sequence.

14. The data processing system of claim 11 further comprising presenting a set of three dimensional objects for user selection; and receiving a user selection from the set of three dimensional objects; wherein presenting the displayed representation of the three dimensional object includes presenting the user selected three dimensional object.

15. The data processing system of claim 14 wherein the authentication sequence for comparison with the predetermined authentication sequence includes the user selected three dimensional object, the plurality of object movement type inputs and the plurality of area selection type inputs.

16. The data processing system of claim 13 wherein a predetermined amount of variation is avowed between the measured temporal components and the predetermined temporal components and wherein the allowed amount of temporal variation is adjusted by the user.

17. The data processing system of claim 11 further comprising displaying the predetermined authentication sequence as a captcha prior to receiving the authentication sequence based upon a combination of the object movement type inputs and active symbol selection type inputs.

18. The computer program product of claim 17 wherein the three dimensional object is rotated as a portion of the captcha whereby the positive. comparison of the predetermined authentication sequence includes a user movement input counter-rotating the three dimensional object.

19. The data processing system of claim 11 wherein the symbol depicted in at least one of the multiple action selection areas is repositioned to another one of the multiple action selection areas upon receiving the plurality of user inputs.

20. The data processing system of claim 11 wherein the plurality of object movement type inputs modify which visible face of the object is an active face, the active face including a plurality of active selection areas, each active selection area including a symbol for selection by the user.

* * * * *